Figure 1:
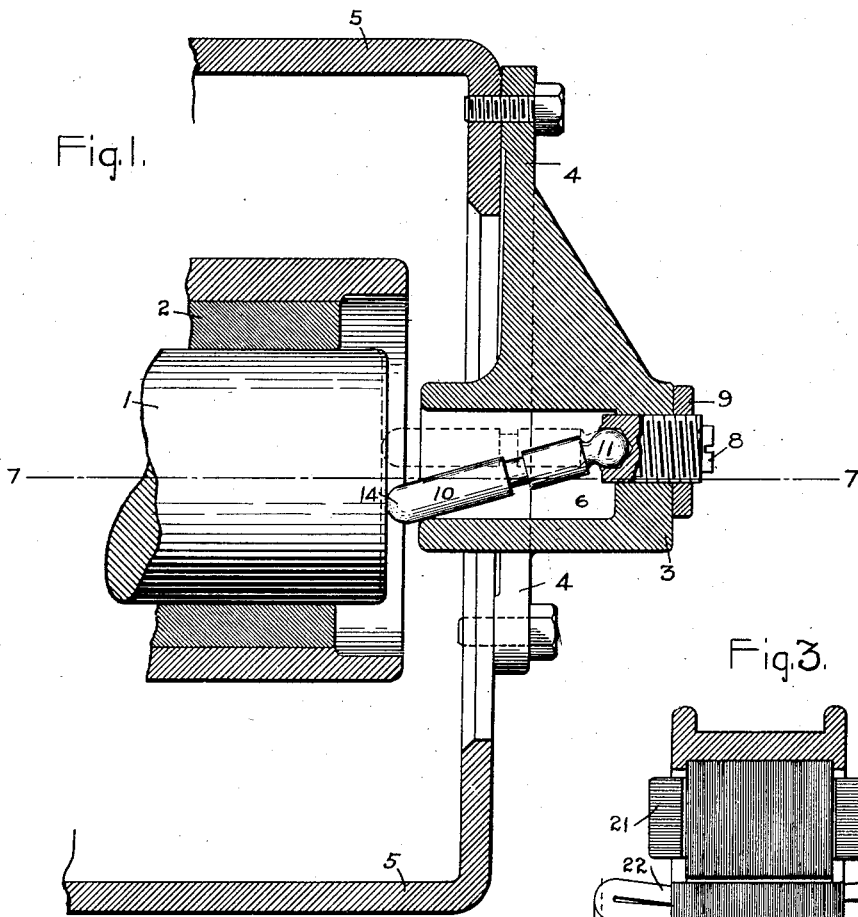

No. 739,598. PATENTED SEPT. 22, 1903.
H. GEISENHÖNER.
END PLAY DEVICE.
APPLICATION FILED MAY 8, 1903.
NO MODEL.

WITNESSES:
INVENTOR:
Henry Geisenhöner,
by Albert G. Davis
Atty.

No. 739,598. Patented September 22, 1903.

UNITED STATES PATENT OFFICE.

HENRY GEISENHÖNER, OF SCHENECTADY, NEW YORK, ASSIGNOR TO GENERAL ELECTRIC COMPANY, A CORPORATION OF NEW YORK.

END-PLAY DEVICE.

SPECIFICATION forming part of Letters Patent No. 739,598, dated September 22, 1903.

Application filed May 8, 1903. Serial No. 156,147. (No model.)

*To all whom it may concern:*

Be it known that I, HENRY GEISENHÖNER, a citizen of the United States, residing at Schenectady, in the county of Schenectady, State of New York, have invented certain new and useful Improvements in End-Play Devices, of which the following is a specification.

This invention relates to a mechanical end-play device for rotary shafts, the object of which is to impart an axial to-and-fro motion to the shaft and the parts carried thereby. Such a device is adaptable for use with rotary shafts of any description, but it finds its greatest field of usefulness in connection with dynamo-electric machines employing a commutator. In these machines the brushes which collect the current from the commutator if allowed to bear always in the same track would soon wear a groove in the commutator and materially reduce its period of usefulness. To prevent this, electromagnetic and mechanical devices have been provided to give an axial motion to the rotary member, so that the track of the brushes varies in such a manner as to include the entire cylindrical surface of the commutator. My invention relates to a mechanical end-play device of this nature. It possesses the advantages of durability, extreme simplicity, and small cost of manufacture.

In carrying out my invention I use a pin having one end mounted in a bearing opposite the end of the shaft and slightly eccentric to its mathematical axis. The other end of the pin protrudes through a ring mounted parallel and in proximity to the end of the shaft. The method of mounting the end of the pin in the bearing is such that the pin is free to move in any direction within the limits imposed by its free end being inclosed within the ring. The free end normally drops by gravity until the side of the pin rests against the bottom of the ring, in which position the end is slightly below the axis of the shaft. When in this position, an axial movement of the shaft will cause the end of the shaft to abut against the free end of the pin, and as the shaft rotates the end of the pin will be carried around with it. Rotation through half a cycle will thus bring the end of the pin to the upper part of the ring, in which position the pin is substantially parallel to the axis of the shaft. This change of the pin from a position inclined to and crossing the axis of the shaft to a position parallel thereto increases the distance between the end of the shaft and the bearing of the pin, so that the shaft is given a thrust away from the pin, and the latter when released from engagement with the end of the shaft drops by gravity to its original position resting against the bottom of the ring.

As the device imparts an axial motion in one direction only, two of the devices may be used, if desired, one mounted in coöperative relation to each end of the shaft; but when used in connection with dynamo-electric machines I prefer to use only one of the devices and to utilize the magnetic attraction of the fields for the armature to return the rotary member to the position in which the end of the shaft again abuts against and picks up the pin.

My invention therefore embodies an end-play device for a rotary shaft comprising a pin having one end supported opposite the end of the shaft and the other end free to move in any direction, the pin normally taking a position inclined to the axis of the shaft. It also embodies other novel features, which will be more fully described hereinafter and definitely pointed out in the appended claims.

Figure 3:
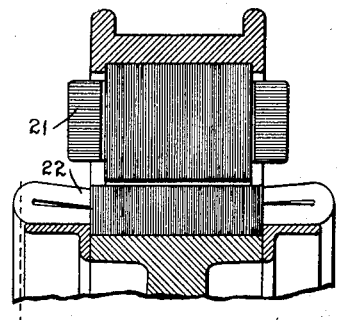
Figure 2:
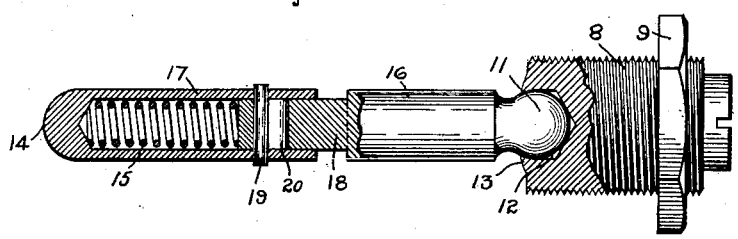

In the accompanying drawings, which illustrate one embodiment of my invention, Figure 1 is a sectional view of my improved end-play device, showing the pin and shaft in elevation. Fig. 2 is a partial section of the pin; and Fig. 3 is a sectional detail of the dynamo-electric machine, showing the relative positions of the stationary and rotary members.

Referring to Fig. 1 of the drawings, 1 indicates a shaft to which an axial to-and-fro motion is to be imparted, rotating in a bearing 2 of any suitable construction. The end-play device comprises a spider-casting 3, provided with radial arms 4 4, by which it is secured to an extension 5 of the frame of the machine or one of the bearings. The manner of attaching the device to the machine forms no part of my invention and may be varied to suit the type of machine with which the device is employed. In some machines—as, for instance, rotary converters—the brush-holder rods may be extended and threaded at their outer ends, and the end-play device may be secured on these rods. The spider 3 is formed with a circular bore 6, extending only a portion of the distance through it and so positioned that when the device is secured in place the center line of the bore will be slightly eccentric to and preferably above the axis of the shaft 1, as indicated in the drawings, in which 7 7 is the axis of the shaft. From the end of bore 6 and eccentric thereto a smaller threaded bore extends through the casting, and in this smaller bore the bearing-plug 8 is adjusted at the proper distance from the end of shaft 1 and locked in position by the nut 9. The inner end of plug 8 is provided with a bearing for the end of the pin or interrupter 10 such that the pin is free to turn in any direction, and the arrangement of the parts is such that this bearing is above the axis of the shaft 1. In the preferred construction I employ a universal ball-joint. The end of the pin is ball-shaped, as shown at 11, and the plug is hollowed out at 12 to receive the ball-shaped end, the edge of the hollowed-out portion being turned over to partially inclose the ball, as indicated at 13. The pin 10 extends through the bore 6 and protrudes slightly beyond the mouth of the bore and has its outer end rounded off, as shown at 14. This end of the pin is free to move by reason of the universal joint 11 to any position within the circular bore 6, which thus forms a ring encircling the free end of the pin. This end normally falls by gravity to the position shown in Fig. 1, resting against the lower side of the bore, in which position it is below the axis of the shaft 1, preferably as far below as the bearing is above the axis.

The pin 10 may be a solid piece of metal; but I prefer to use the construction shown in Fig. 2, in which the pin is made elastic by the spring 15. As thus constructed the pin is made up of two parts 16 and 17, a tongue 18 on the former being arranged to slide for a limited distance within a bore in the latter. Within the bore is a strong spring 15, which is compressed between the end of the tongue 18 and the inner end of the bore. A cotter-pin 19, extending through a slot 20 in the tongue 18 and secured in the sides of the bore, limits the movement of the tongue within the bore.

The operation of the device will be readily understood from the foregoing description. The pin being in the position shown in Fig. 1, the end of the shaft 1 at a point below its axis abuts against the rounded end 14 of the pin, and as the shaft rotates the pin is carried around with it to the position shown in dotted lines in Fig. 1, in which position the end of the pin is above the axis of the shaft. In moving to this position the spring 15 within the pin is compressed, and as the tension increases a thrust away from the device is imparted to the shaft. This axial movement of the shaft frees the pin from engagement with the end of the shaft, and it drops to its original position resting against the lower side of the bore 6. To return the shaft into engagement with the pin again, a similar device could be mounted in coöperative relation to the other end of the shaft; but in dynamo-electric machines I prefer to arrange the parts so that the thrust is against the normal bias exerted by the field-magnets on the armature. This is illustrated in Fig. 3, in which 21 represents the field, and 22 the armature, of a rotary converter. The magnetic attraction of the fields tends to hold the armature in the position shown, and when the end-play device moves the rotary member to the position shown in dotted lines this attraction restores it to its original position, bringing the end of the shaft again into contact with the pin.

What I claim as new, and desire to secure by Letters Patent of the United States, is—

1. An end-play device for a rotary shaft, comprising a pin one end of which is mounted in a universal bearing opposite the end of the shaft and the other end free to turn in any direction.

2. An end-play device for a rotary shaft, comprising a movable pin eccentrically mounted opposite the end of the shaft and adapted to engage the shaft at its free end.

3. An end-play device for a rotary shaft, comprising a pin one end of which is mounted in a bearing opposite the end of the shaft and eccentric to its axis and the other end free to turn in any direction, and means for arresting the free end of the pin when disengaged from the shaft.

4. Means for effecting end play in rotary machines, comprising a shaft having a bias in one direction and a pin mounted to rock opposite the end of the shaft and arranged so that the end of the shaft abuts against the end of the pin when actuated by said bias.

5. Means for effecting end play in rotary machines, comprising a shaft having a bias in one direction and a pin mounted in a universal bearing opposite the end of the shaft and arranged so that the end of the shaft abuts against the end of the pin when actuated by said bias.

6. An end-play device for a rotary shaft, comprising a pin pivotally mounted opposite the end of the shaft and normally resting at an angle to the axis of the shaft, one end of said pin extending in proximity to the end of the shaft and arranged to be engaged thereby.

7. An end-play device comprising a pin, a universal bearing therefor, means for supporting the bearing opposite the end of the shaft, and means for adjusting the bearing toward and away from the shaft and locking it in any adjusted position.

8. An end-play device for a rotary shaft, comprising a pin, a bearing therefor arranged so that one end of the pin is free to turn in any direction, and a support encircling the free end of the pin.

9. An end-play device for a rotary shaft, comprising a pin having one end mounted in a bearing opposite the end of the shaft and eccentric thereto and the other end arranged to engage the end of the shaft.

10. An end-play device for a rotary shaft, comprising a movable pin eccentrically mounted opposite the end of the shaft, one end of said pin being provided with a spring-tip adapted to engage the end of the shaft.

In witness whereof I have hereunto set my hand this 6th day of May, 1903.

HENRY GEISENHÖNER.

Witnesses:
BENJAMIN B. HULL,
HELEN ORFORD.